United States Patent Office.

IMPROVED MODE OF TREATING HEMP, FLAX, &c.

THOMAS GRAY, OF UNION ROAD, WANDSWORTH, ENGLAND.

Letters Patent No. 60,177, dated December 4, 1866.

SPECIFICATION.

TO ALL WHOM IT MAY CONCERN:

Be it known that I, THOMAS GRAY, bleacher, of 32 Union Road, Wandsworth, late of Mitcham, in the county of Surrey, in England, at present residing at No. 6 Fourth street, in the city of Williamsburg, State of New York, have invented a new and useful invention for an Improved Mode of Treating Flax, Hemp, and other fibrous substances.

The object of this invention is to remove the bark or skin, and resinous or gummy matter, and the boon or woody fibres of flax, hemp, grass, and other like plants, in an economical and expeditious manner, by treating the said substances as hereinafter set forth, thereby separating the fibres while in a wet state, and preparing the same for manufacturing and useful purposes.

I first take flax as collected, scotched, retted or unretted, or hemp, or China grass, or other like vegetable fibres, and cut the same into convenient lengths for operating upon the material. I then open and steep and boil it in an alkaline solution (say soda ash dissolved in water) from four to twelve hours. I use in this operation of boiling from fifteen to thirty pounds of soda ash, according to the thickness of the fibres of the material in hand, to every two hundred pounds of hemp, flax, grass, or substance under treatment; after which, and while in a wet state, the material is transferred to a fulling-stock or other suitable machine or vessel. A warm or hot alkaline solution is more speedy and effective in its operation when the flax, hemp, grass, &c., are steeped previous to boiling. The fibre, thus treated, I submit to the action of a machine known as ordinary fulling-stock, or any other suitable bruising machine, and at the same time, while the said machine is in motion, turning, bruising, and pressing, and operating on the material, applying water through a perforated pipe in jets to loosen the skin, bark, or gum. I then fill the trough with warm or cold water, or with the liquor in which the material was steeped or boiled. By keeping up the supply the skin, boon, or woody particles, and also the miscellaneous matter, will float away with the waste water. After this operation I take the fibrous material out and place it in an ordinary vessel or washing engine, and submit it to further motion or agitation in order to rid it, so far as may be, of the remaining mucilage, if any, and extraneous matter; boiling the same, if required, the second time, with the addition of soda ash, so that the material is effectually treated while in motion and floating. Or the material may be placed in a stationary boiling vessel from one to two hours, according to the judgment of the operator, to eradicate mucilaginous matter. After this, I thoroughly wash the material in the agitating vessel, as aforesaid, in a weak acid bath medicinally used, composed of one pound of sulphuric acid to a cwt. of material, said bath to be continued about fifteen minutes, in order to neutralize or precipitate the alkaline left in the fibre of the material. Then I remove the acidulated water and wash the material in simple fresh water in order to remove all acid, if any, from the fibre. The material is then ready for bleaching. The process of bleaching I effect by mixing with the ordinary bleaching-liquor in a cold state, saponified fat or oil which has been previously dissolved in warm water, and pouring this mixture into the engine or vessel containing the said material and warm water, and working, agitating, and moving the mixture and material together for some thirty minutes or more. After this, the whole, if required, is let down into a vessel to remain for six or twelve hours to allow the whole of the gas of the chlorine to be absorbed and exhausted by operating on the fibres. It is then removed and washed in cold water. Then I place the material in an alkaline solution of fat or oil, that is to say, I take two to four pounds of saponified fat or oil to one hundred pounds of hemp or flax, &c. It is then again rinsed or washed in cold water, if required, and allowed to drain. The fibre is then submitted to an hydro-extractor or other convenient drying means, and afterwards placed in a suitable drying-room. When dry, the fibre may be softened in a fulling-stock or any other softening machine. When opened by a tenter-hook or willey machine, or picker, or ordinary pulling machine, it is ready for heckling or carding machinery. In using bleaching powder for the liquor I take from six to twelve pounds and upwards, as required, dissolved in cold water, to one hundred pounds of fibre, mixing with it two pounds of saponified fat or oil dissolved in hot water; the fat or oil to be dissolved in the hot water before being united with the bleaching liquor.

I claim as my invention the new and useful and improved method of treating flax, hemp, grasses, and other like fibrous substances for manufacturing and useful purposes, in removing the bark or skin, and resinous or gummy mucilage, and the boon or woody fibres of flax and other like plants, while in a wet state, and in neutralizing the alkaline matter left in the fibre previous to bleaching in the manner hereinbefore set forth, and in bleaching the same with a combination of bleaching-liquor and alkaline saponified fat or oil, or with an alkaline solution without the fat or oil, so that the fibres, after the process of bleaching is completed, are rendered stronger than they were in their natural or original state; and I also claim by my invention the permeating the fibre with saponified fat or oil, as herein set forth.

THOMAS GRAY.

Witnesses:
 ROBT. A. HOOPER,
 J. V. FRENCH.